(12) United States Patent
Weber

(10) Patent No.: US 9,364,009 B2
(45) Date of Patent: Jun. 14, 2016

(54) METHOD FOR THE SKINNING OF SAUSAGES

(75) Inventor: Guenther Weber, Gross Nemerow (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 707 days.

(21) Appl. No.: 12/681,096

(22) PCT Filed: Oct. 2, 2008

(86) PCT No.: PCT/EP2008/008375
§ 371 (c)(1),
(2), (4) Date: Jun. 17, 2010

(87) PCT Pub. No.: WO2009/046937
PCT Pub. Date: Apr. 16, 2009

(65) Prior Publication Data
US 2010/0272874 A1  Oct. 28, 2010

(30) Foreign Application Priority Data
Oct. 2, 2007  (DE) .......................... 10 2007 047 114

(51) Int. Cl.
*A23C 11/00* (2006.01)
*A22C 11/00* (2006.01)

(52) U.S. Cl.
CPC ............... *A22C 11/003* (2013.01); *A22C 11/00* (2013.01); *A22C 11/001* (2013.01)

(58) Field of Classification Search
CPC .... A22C 11/03; A22C 11/003; A22C 11/001; A22C 11/00
USPC ........................ 426/474, 480, 105; 452/30, 50
See application file for complete search history.

(56) References Cited

U.S. PATENT DOCUMENTS

| 2,434,316 A | 1/1948 | Golden et al. |
| 3,487,498 A | 1/1970 | Grandon et al. |

(Continued)

FOREIGN PATENT DOCUMENTS

| DE | 29 13 803 C2 | 10/1979 |
| DE | 35 00 026 A1 | 7/1986 |
| DE | 91 04 598.3 U1 | 4/1991 |
| DE | 93 17 428 U1 | 11/1993 |
| DE | 43 31 205 A1 | 3/1995 |
| DE | 195 09 197 A1 | 9/1996 |
| DE | 198 49 936 A1 | 5/1999 |

(Continued)

OTHER PUBLICATIONS

EP 509477 A1 Eng. Translation Oct. 1992. European Patent Mauderer et a.*

*Primary Examiner* — Anthony Weier
(74) *Attorney, Agent, or Firm* — Kilpatrick Townsend & Stockton LLP

(57) ABSTRACT

The present invention relates to a method for skinning sausages or other food products, wherein an initial cut is made on a front end of said sausage, particularly in the region of an end-side tapering of the sausage, the skin is grabbed in the region of the initial cut at two points located at a distance from each other in the circumferential direction by means of two gripping elements, wherein the skin is particularly pulled onto a plane in a planar manner by a first working movement, particularly onto the contact surface of the sausage, the skin is cut parallel to the longitudinal extension of the sausage starting at the initial cut in the region between the gripping elements, the skin is lifted up away from the plane by a working movement of the gripping elements, and the sausage is conveyed parallel to the longitudinal extension thereof, particularly relative to the position of the gripping elements holding the sausage in a lifted position, and the skin is thus pulled off the sausage.

19 Claims, 16 Drawing Sheets

(56) References Cited

U.S. PATENT DOCUMENTS

Figure 5:
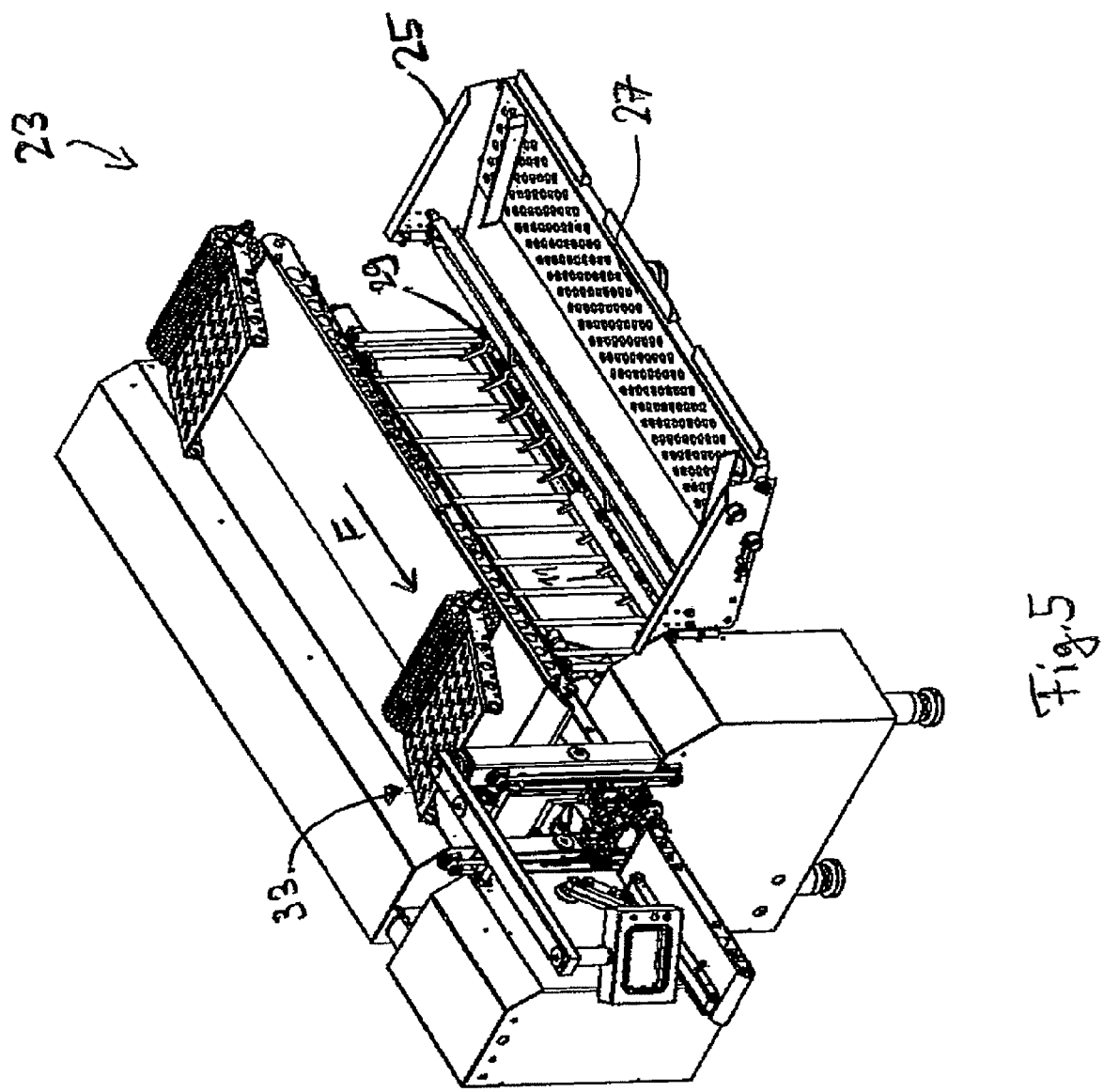

| | | |
|---|---|---|
| 3,583,023 A | 6/1971 | Von Lersner et al. |
| 4,158,417 A | 6/1979 | Inoue |
| 4,222,150 A | 9/1980 | Andersen |
| 4,637,095 A | 1/1987 | Maruska |
| 4,682,387 A | 7/1987 | Leining |
| 5,423,649 A | 6/1995 | Maeda et al. |
| 6,656,031 B1 * | 12/2003 | Andersson ...................... 452/50 |

FOREIGN PATENT DOCUMENTS

| | | | |
|---|---|---|---|
| DE | 699 15 681 T2 | 3/2005 | |
| EP | 0 509 477 * | 4/1992 | ............ A22C 11/00 |
| EP | 0 509 477 A1 | 4/1992 | |
| EP | 0 732 054 A1 | 9/1996 | |
| EP | 1 139 768 B1 | 12/1999 | |
| WO | WO 96/17522 A1 | 6/1996 | |
| WO | WO 2009/046937 A1 | 4/2009 | |

* cited by examiner

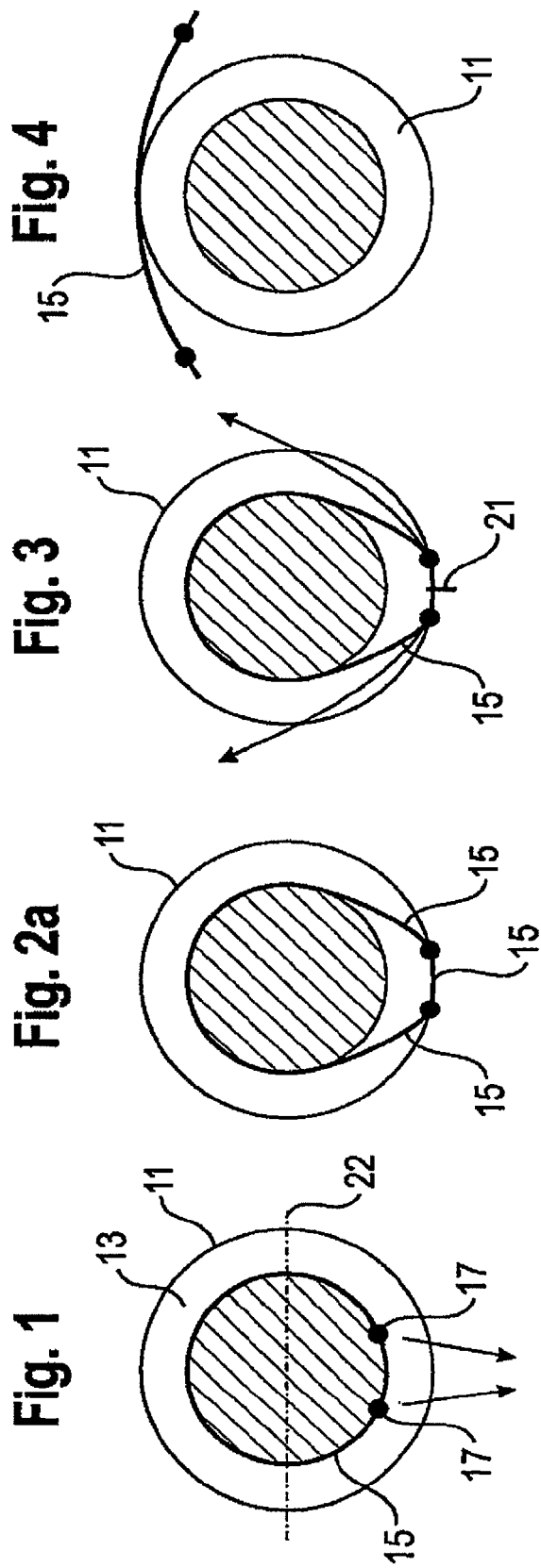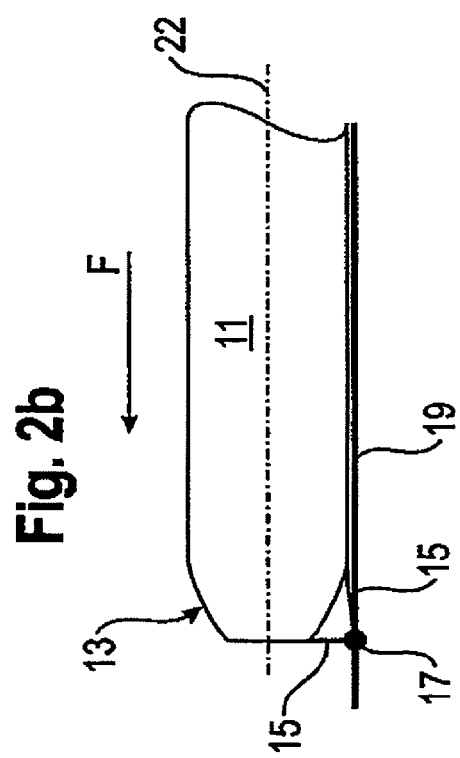

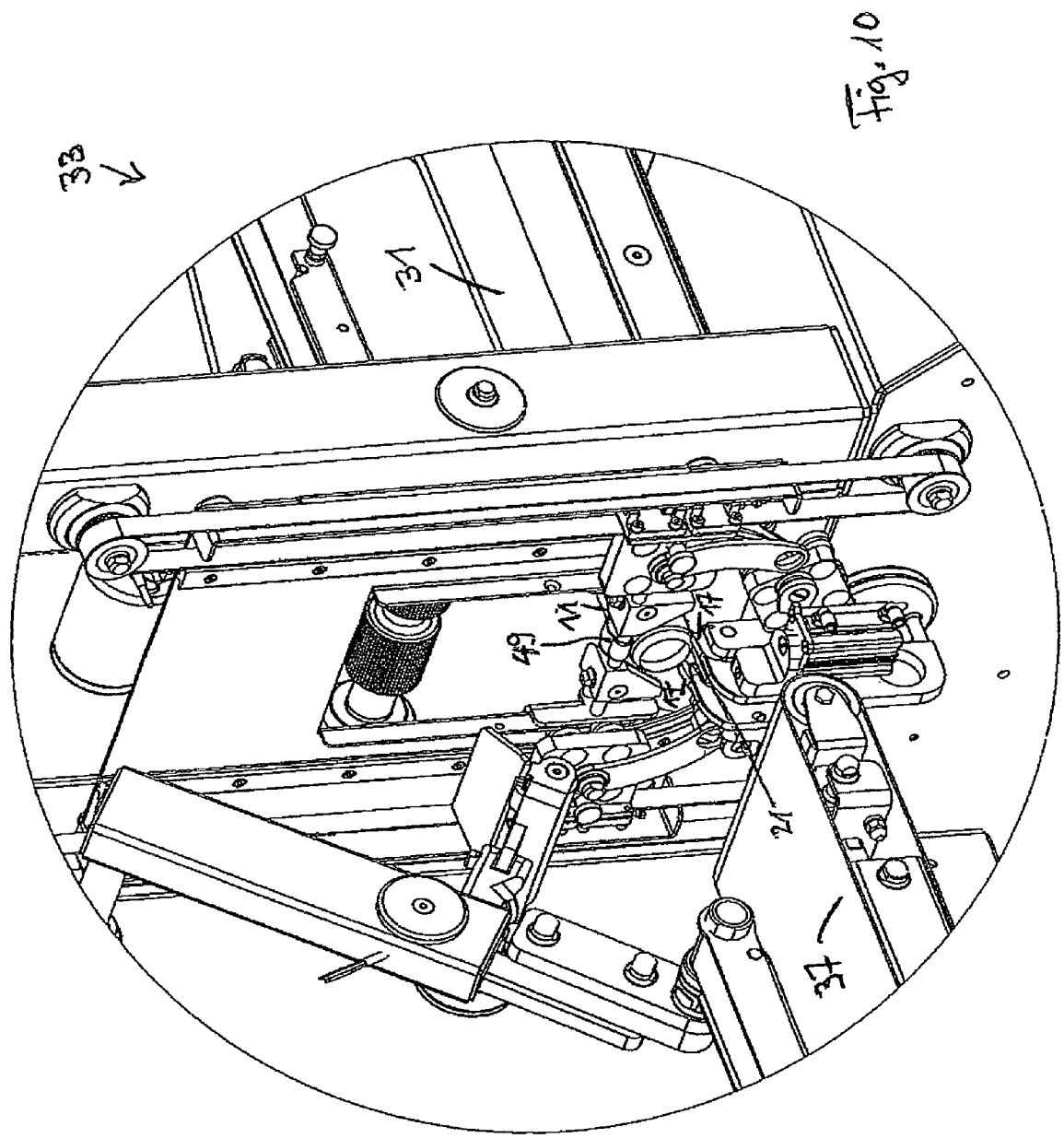

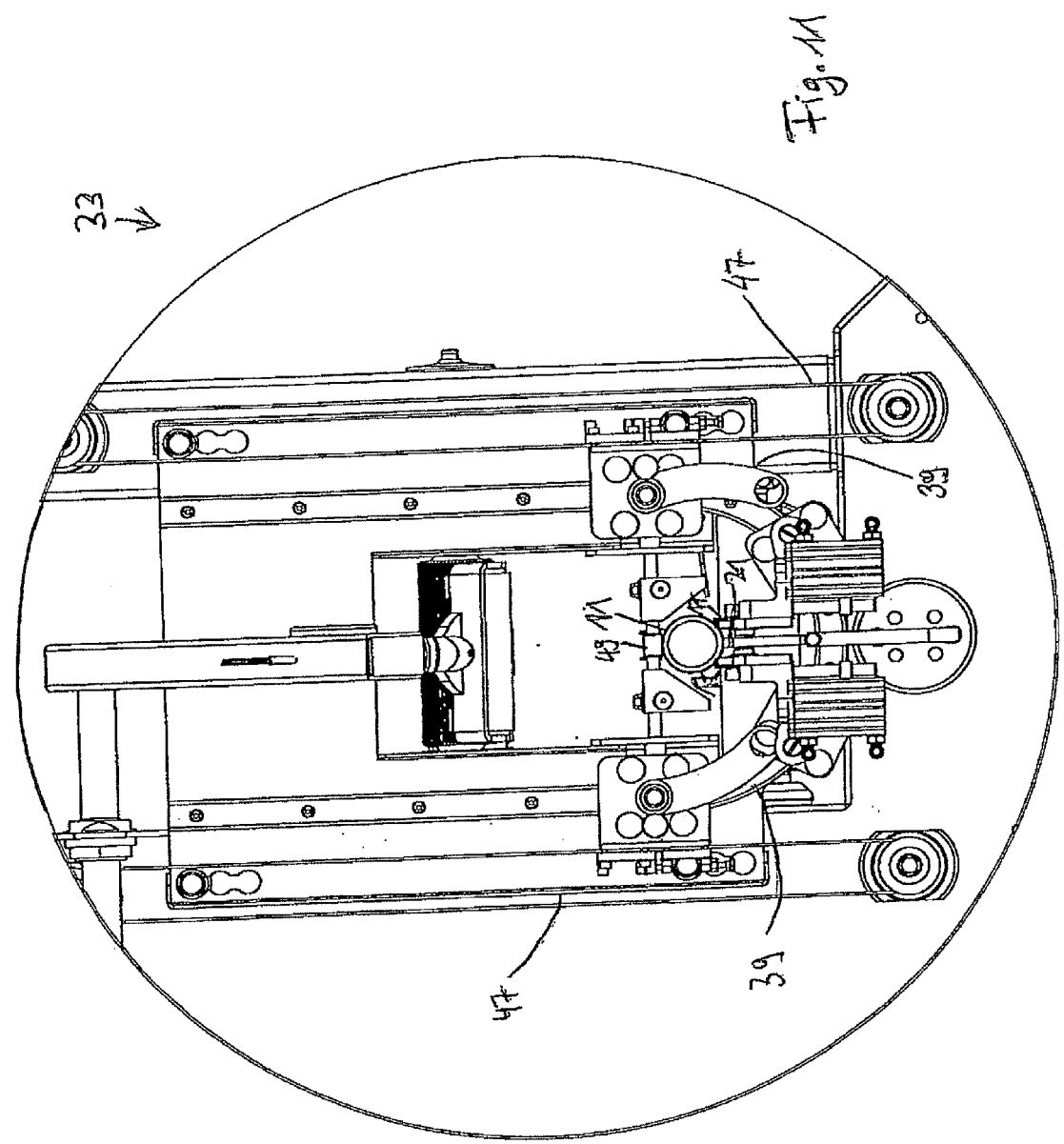

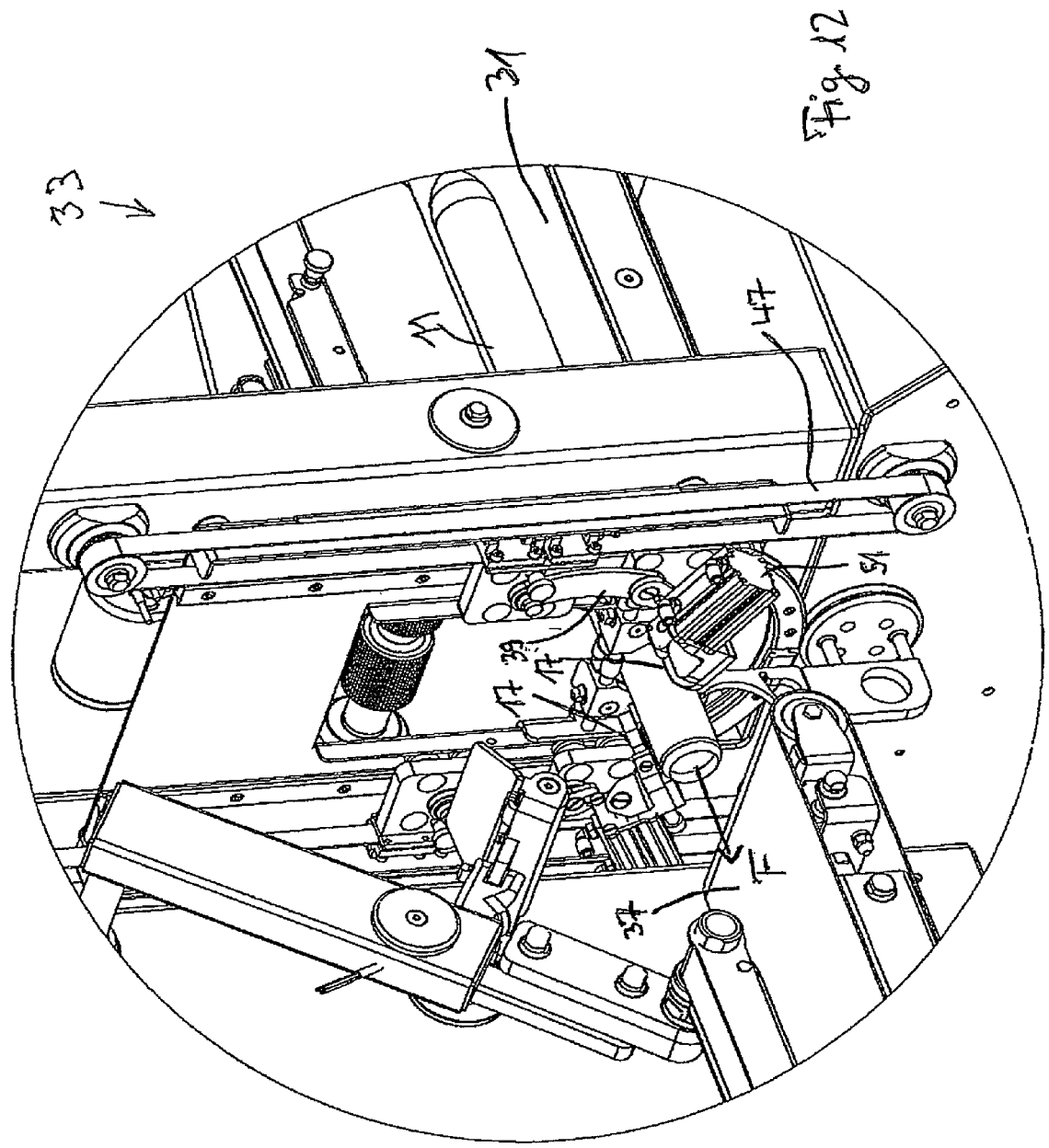

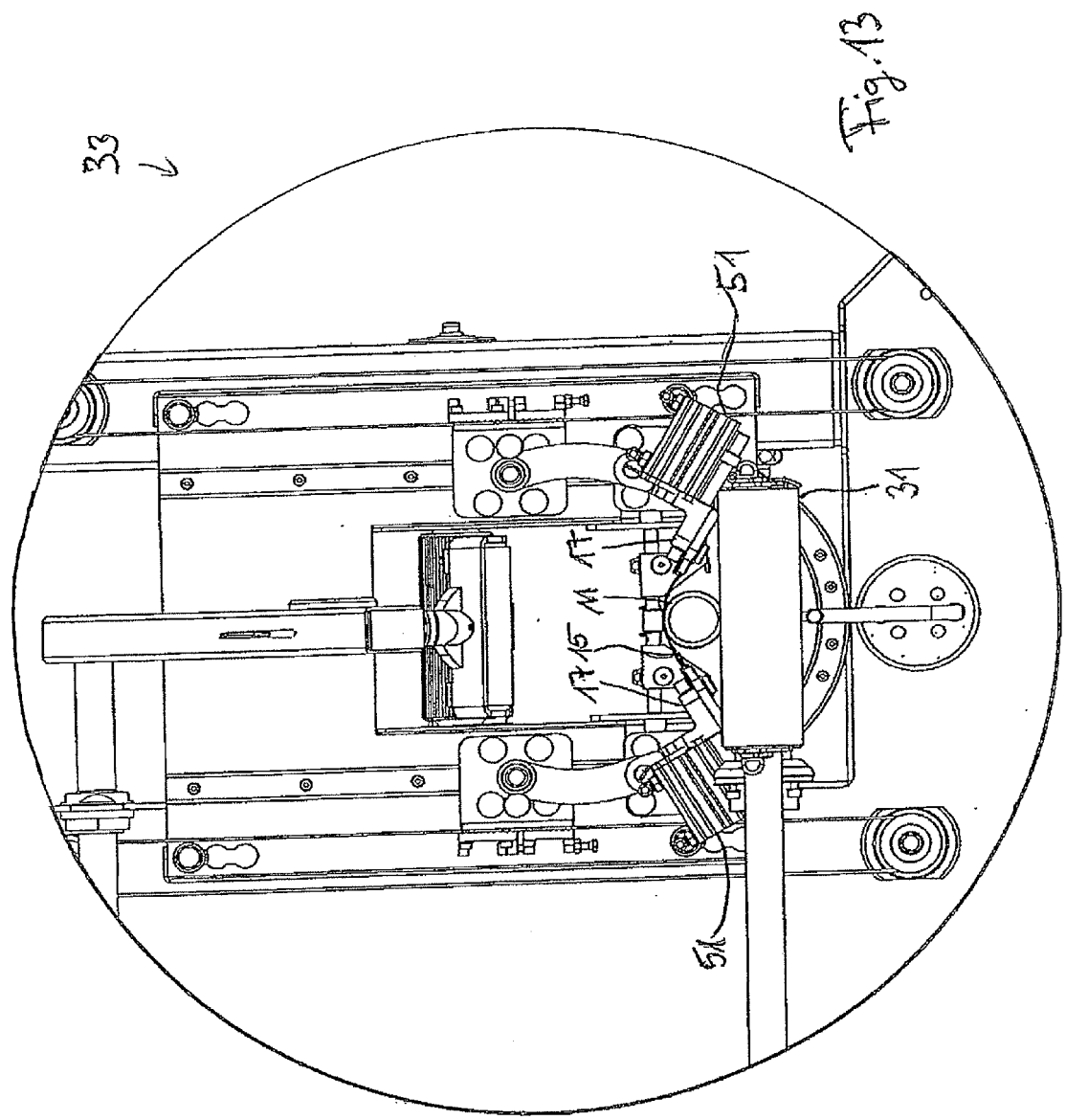

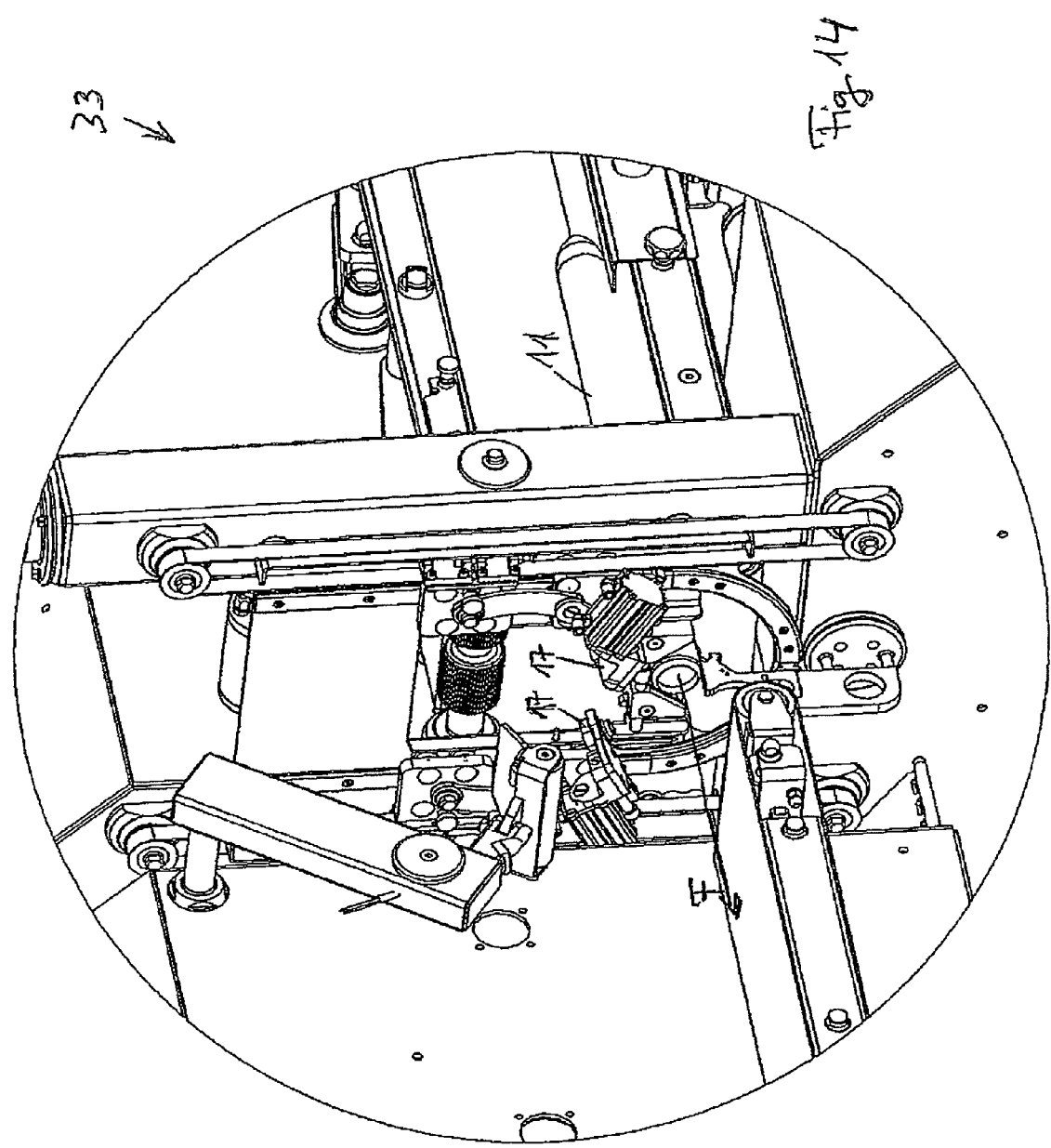

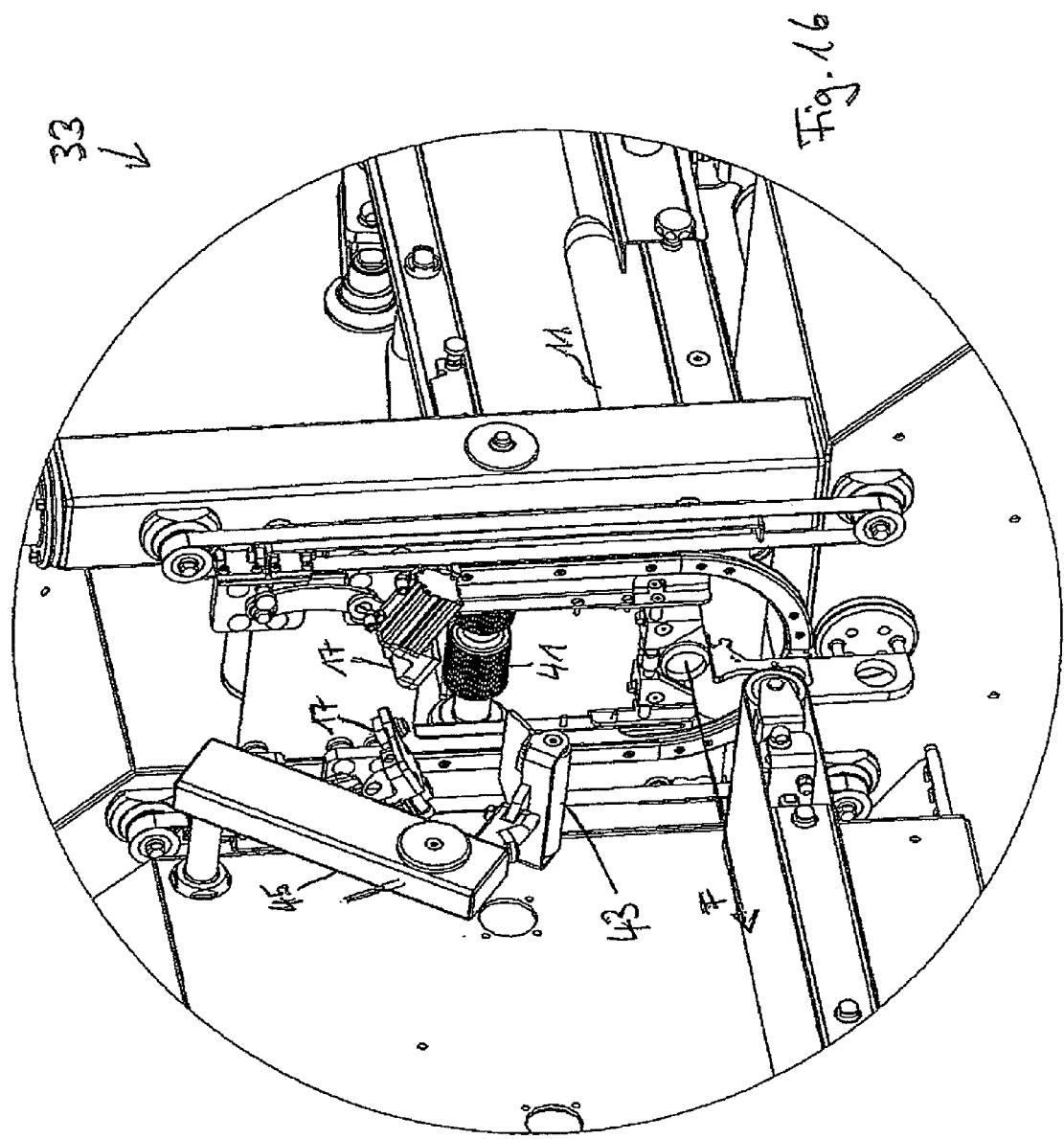

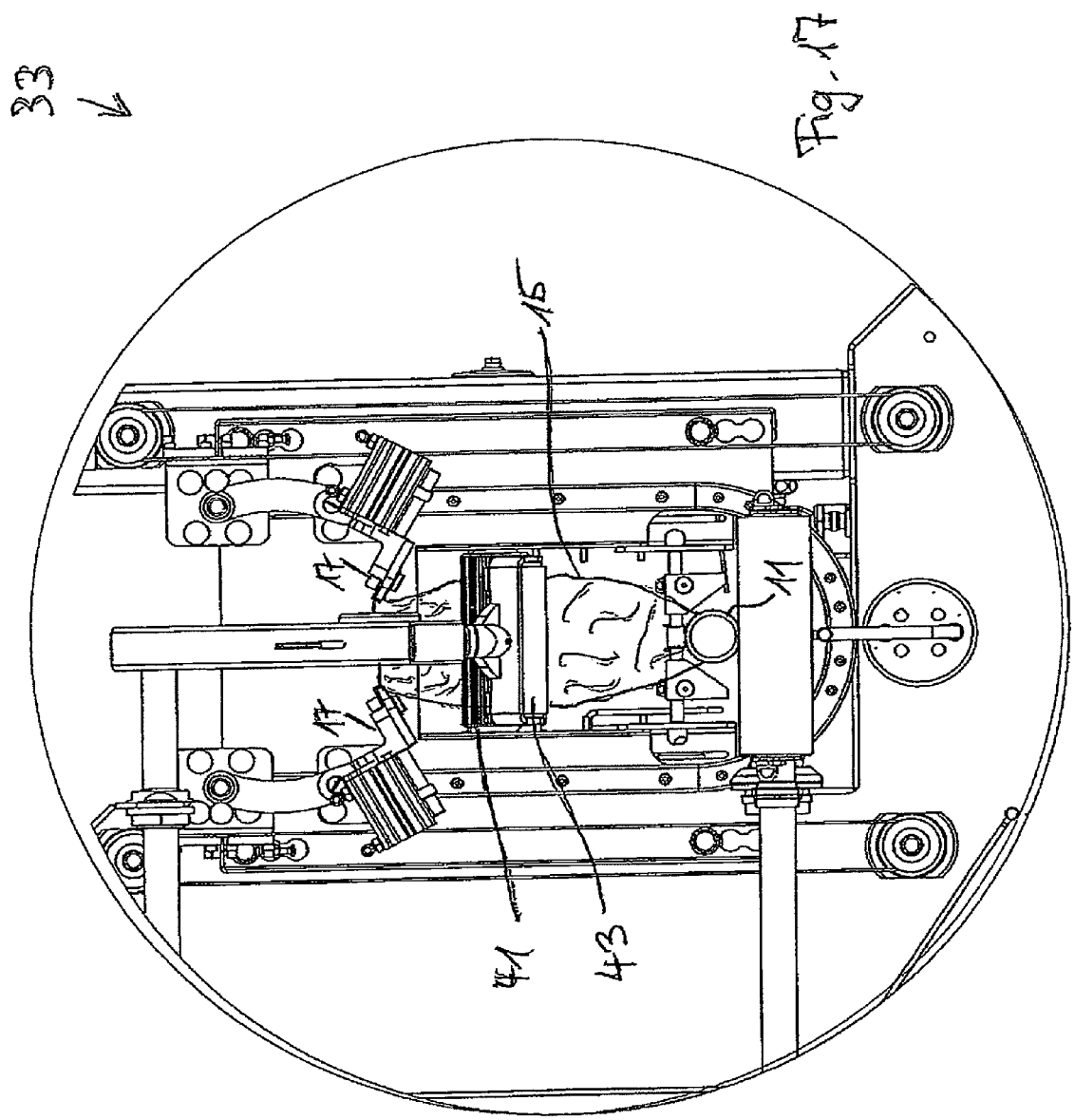

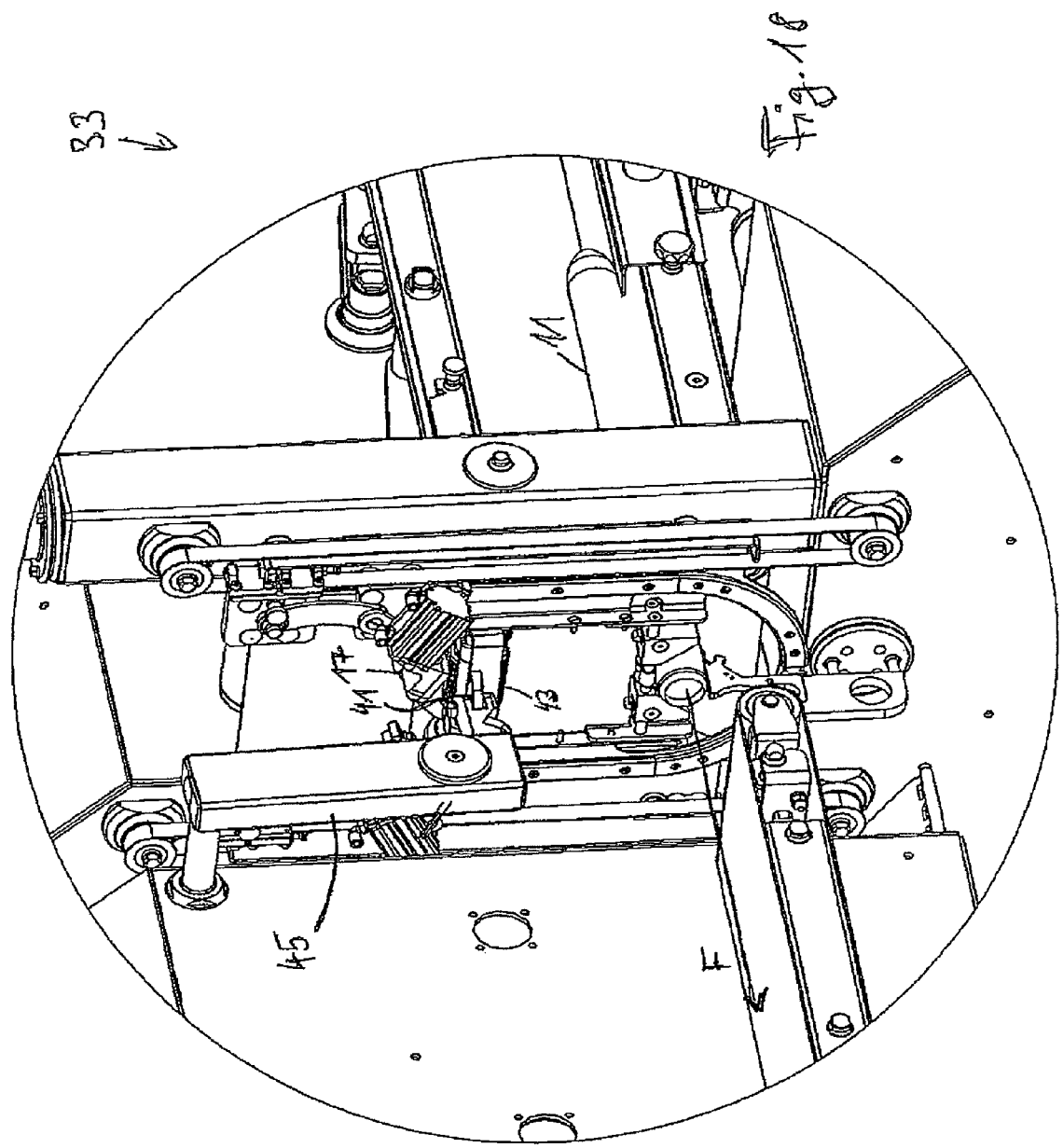

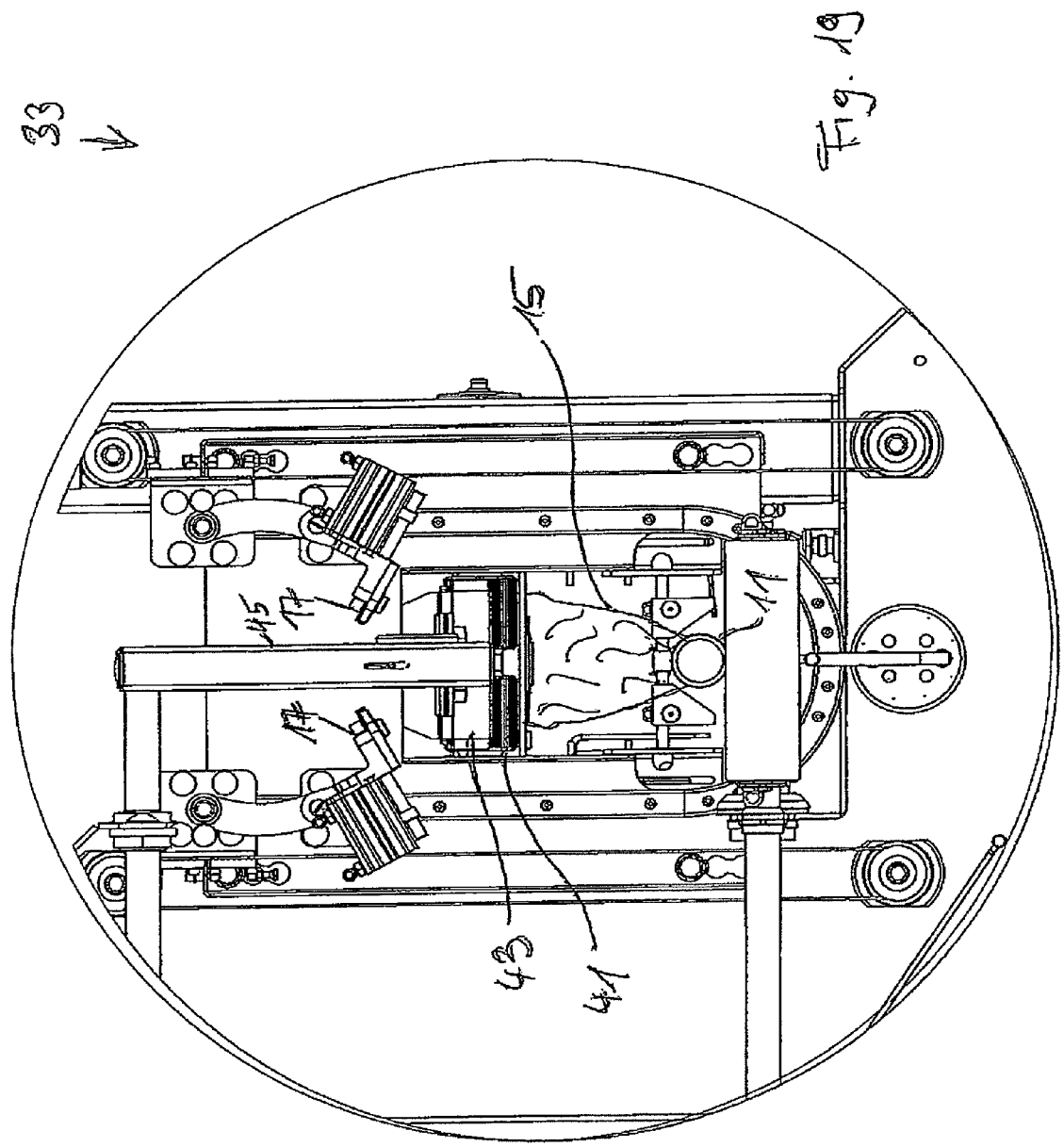

METHOD FOR THE SKINNING OF SAUSAGES

CROSS-REFERENCES TO RELATED APPLICATIONS

This application is a National Stage of International Application No. PCT/EP2008/008375 filed Oct. 2, 2008, and which claims the benefit of German Patent Application No. 10 2007 047 114.0, filed Oct. 2, 2007, the disclosures of which are incorporated herein by reference.

The invention relates to a method and to an apparatus for the skinning of sausages or of other products, in particular of food products.

It is in particular a case of those sausages which, for example, have a length of a plurality of meters and a diameter of, for example, 5 to 15 cm. Such sausages are in particular sliced with high-speed slicers. The sausages have to be skinned before the slicing. This was previously done by hand, which is labor intensive and time intensive.

A method and an apparatus for the removal of the skin of a sausage are known from DE 699 15 681 T2.

It is the object of the invention to provide a possibility to be able to carry out the skinning of sausages or of other products mechanically as much as possible and as fast as possible in this respect.

This object is satisfied by the features of method claim 1 and by the features of apparatus claim 14.

The invention is generally not only suitable for the skinning of sausages, but also of other foods or of other products which are in particular of elongated shape and are surrounded by a cover, a skin or envelope which can in particular be removed as a whole.

In accordance with an embodiment of the invention, a method is provided for the skinning of sausages or of other food products in which a starter cut is provided at a front sausage end, in particular in the region of a tapering section of the sausage at an end. The skin is gripped in the region of the front end by means of two gripping members at two points spaced apart from one another in the peripheral direction. An incision is then made into the skin, starting from the starter cut, in the region between the gripping members and parallel to the longitudinal extent of the sausage and the skin is raised by a working movement of the gripping members. The sausage is conveyed parallel to its longitudinal extent, in particular relative to the gripping members holding the skin fixedly in the raised position, and the skin is pulled off the sausage in this process. Alternatively, the gripping members can be moved, in particular starting from the raised position, in the direction of the longitudinal extent of the sausage so that the skin is in this process pulled off the sausage which is not moved or which is moved in the opposite direction to the gripping members.

In accordance with an embodiment of the invention, after the gripping of the skin by the gripping members, the skin is drawn flat into a plane extending parallel to the support surface for the sausage by a first working movement of the gripping members and an incision is then made. The raising of the skin out of the plane then corresponds to a second working movement of the gripping members. It is advantageous in this that a defined region in which the incision takes place in the skin is given by the preset plane. A knife used for this purpose, for example, therefore does not have to be brought to the starter cut of the sausage to make the incision into the skin there. No complex and/or expensive device is thus required to move the knife to the starter cut of the sausage.

In accordance with an embodiment of the invention, the support surface for the sausage is substantially in the plane into which the skin is drawn flat by a first working movement of the gripping members. The support surface can, for example, be interrupted so that the skin is held by the gripping means in free space in the plane and a knife can, for example, incise the skin without impediment by the support surface. It is furthermore advantageous in this that the knife then no longer has to be repositioned to cut through the skin of the sausage up to the rear sausage end when the sausage is moved over the knife.

In accordance with an embodiment of the invention, the starter cut is provided by cutting off the end of the sausage, for example substantially perpendicular to the longitudinal extent of the sausage. The starter cut can also be provided by a spot drilling of the end of the sausage substantially parallel to the longitudinal extent of the sausage.

In accordance with an embodiment of the invention, substantially no conveying movement of the sausage takes place relevant to the gripping members during the pulling flat of the skin and during the incision of the skin taking place in the region of the starter cut. The skin thus remains flat between the gripping members on the plane and is advantageously tautened by the gripping members so that an incision can be made in the skin and the skin does not slide over the knife, for instance due to too low a tension, or folds over in front of the knife, but is not cut.

In accordance with an embodiment of the invention, the skin ends gripped by the gripping members are simultaneously moved away from the plane and from one another on the raising of the skin. The sausage located above the gripping members is thus so-to-say by-passed by the gripping members.

In accordance with an embodiment of the invention, the working movement of the gripping members serving for the raising of the skin is carried out as a stroke movement simultaneous with a moving apart. The stroke movement substantially takes place in the same sense in a linear fashion and the movement apart takes place in opposite senses along a curved path.

In accordance with an embodiment of the invention, the conveying movement of the sausage relative to the gripping members already starts during the raising of the skin. The time duration for the skinning procedure can thereby be shortened.

In accordance with an embodiment of the invention, an incision is continued into the skin up to the rear product end during the conveying movement of the sausage relative to the gripping members while continuing the incision which took place at the starter cut.

Provision can be made that the skin is supplied by the gripping members to an additional holding and/or conveying device which, when the sausage is conveyed for the removal of the skin, either only holds the skin tight or actively pulls at the skin. Alternatively, the holding and conveying device can be moved with respect to the non-conveyed sausage or to the sausage moved in the opposite direction to the holding and conveying device to pull the skin off the sausage.

In accordance with an embodiment of the invention, the skin is brought between a first element and a second element by the second working movement of the gripping members. The two elements are preferably designed in the form of rollers. The first element and the second element engage the skin and transport it away.

In accordance with an embodiment of the invention, the gripping members release the skin after the engaging of the skin by the first and second elements so that the skin is afterward removed from the sausage by means of the elements. In this respect, the gripping members can remain in the end position of the second movement until the sausage is completely skinned.

In accordance with an embodiment of the invention, the two points which are spaced apart from one another in the peripheral direction and at which the skin is gripped by means of the gripping members are beneath a horizontally aligned central plane which extends in the central axis of the sausage. It thereby becomes possible to pull the skin downwardly in the region between the gripping members by a substantially vertically extending first working movement into a plane in which the incision takes place in the skin.

In accordance with an embodiment of the invention, each gripping member has two finger-like grippers which engage the skin.

The invention furthermore relates to an apparatus for the skinning of sausages or of other food products which includes means and/or components and/or devices for the carrying out of the method in accordance with the invention.

Figure 6:
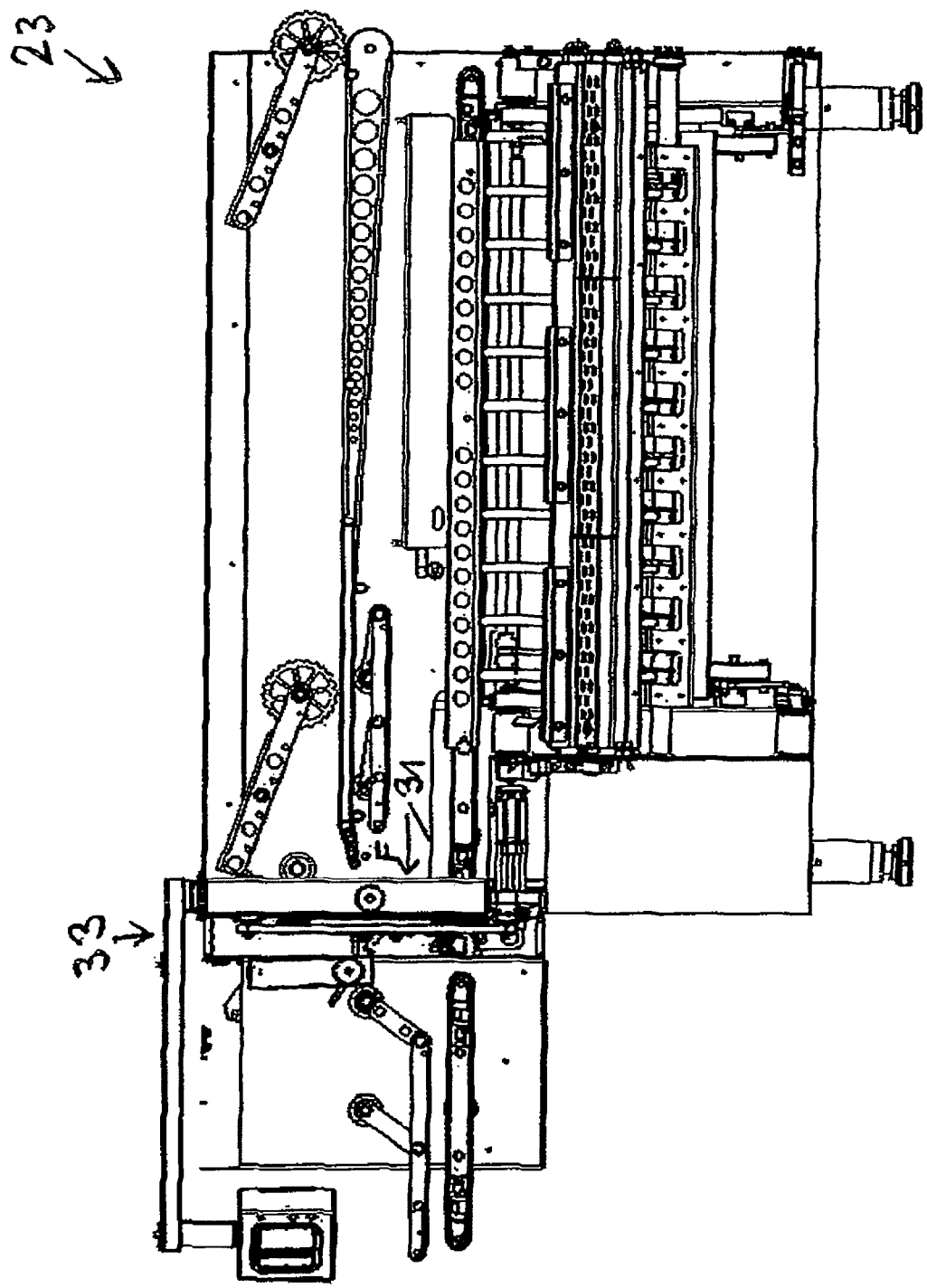
Figure 3:
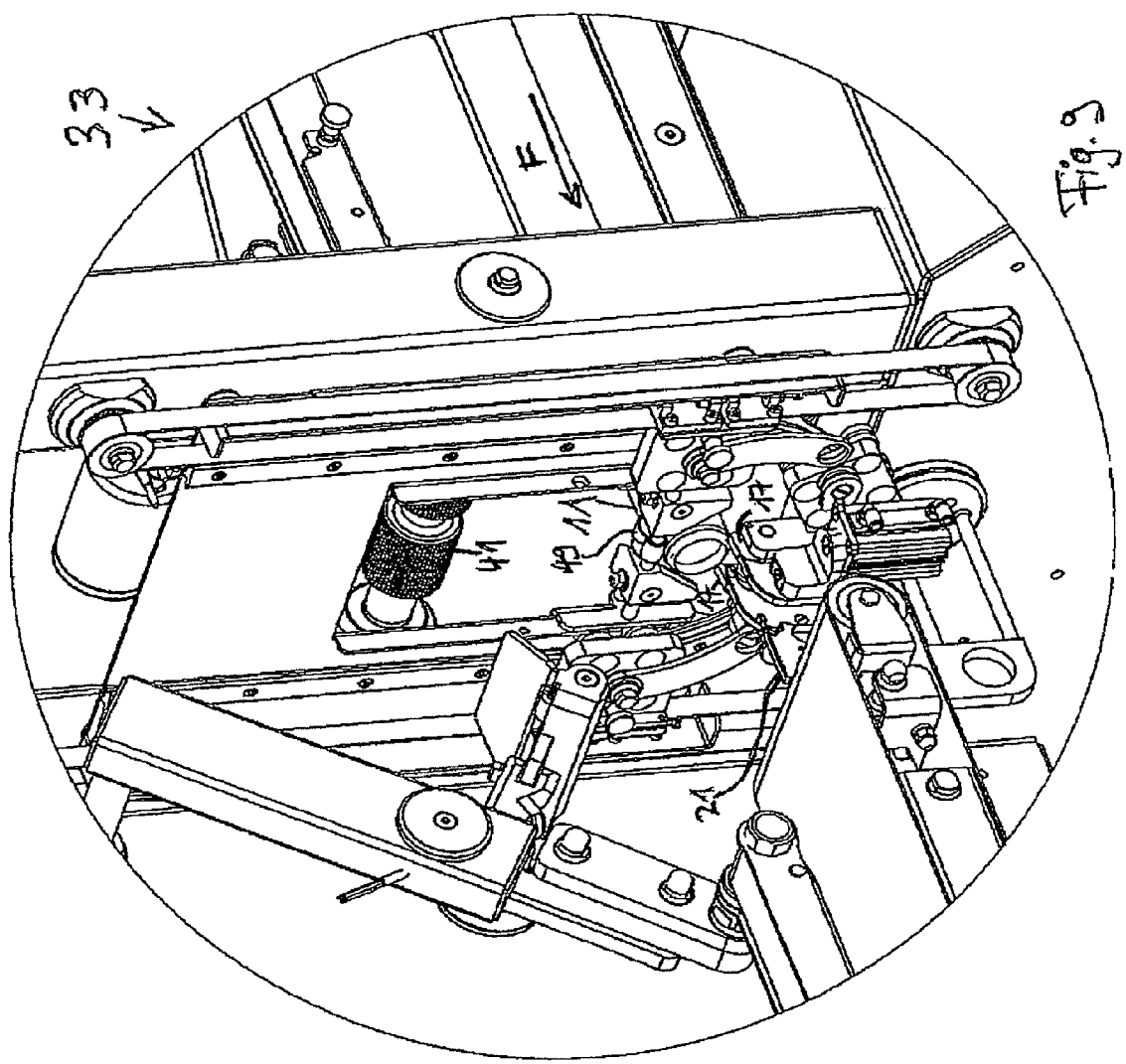

The present invention will be described in the following purely by way of example with reference to advantageous embodiments and to the enclosed drawings. There are shown:

FIG. 1 a schematic plan view of an apparatus in accordance with the invention in which gripping members grip the skin of a sausage;

FIG. 2a a further schematic plan view of the apparatus in accordance with the invention in which the gripping members have drawn the skin flat;

FIG. 2b a schematic side view of the situation of FIG. 2a;

FIG. 3 a further schematic plan view of the apparatus in accordance with the invention in which a starter cut takes place in the region of the skin between the gripping members;

FIG. 4 a further schematic plan view of the apparatus in accordance with the invention in which the gripping members have raised the skin after a second working movement has taken place;

FIG. 5 a perspective view of an apparatus in accordance with the invention;

FIG. 6 a side view of the apparatus in accordance with the invention of FIG. 5; and FIGS. 7, 8, 9, 10, 11, 12, 13, 14, 15, 16, 17, 18, and 19 different representations of a skinning station arranged within the apparatus in accordance with the invention.

FIG. 1 schematically shows an apparatus in accordance with the invention in which initially a defined starter cut is made at the front end of a sausage 11. This starter cut is in particular provided in a tapering round-end section 13 of the sausage 11. The so-called product clip is hereby removed which cooperates with the skin and simultaneously closes the sausage.

The starter cut can be provided, for example, by cutting away the tip of the round end. This can take place, for example—if provided—in a workstep in which the sausage is raised to the actual skinning station and is in this respect moved past a blade. Such a cutting off can in particular be selected with comparatively small-bore products. Alternatively, the sausage end can be spot-drilled at the end to provide the starter cut. For this purpose, a hole of e.g. approximately 30 mm in size and approximately 5 mm in depth is drilled into the front product end, for example, at the end by means of a hollow drill. Since the round end of the sausage is anyway not used later, the contact of the drill with the sausage is not problematic with respect to possible contamination.

After the starter cut or spot-drilling, the sausage 11 is brought onto a skinning plane, e.g. guided up transversely to the actual conveying direction F, as is shown in FIG. 2b, and is optionally simultaneously raised and is transported to the actual skinning station by means of conveyor belts. The skinning station includes a defined plane which corresponds, for example, with the support surface 19 (FIG. 2b) for the sausage.

As soon as the front product end with the starter cut is e.g. detected by a light barrier of the skinning station, two gripping members 17 are activated. They engage into the end of the product and in this respect grip the skin 15 at two points spaced apart from one another in the peripheral direction (FIG. 1). The mutually spaced apart points are preferably beneath a horizontally extending central plane 22 in which the central axis of the sausage 11 is disposed.

The embodiment of the gripping members 17 is generally as desired. They are in particular designed such that they can grip the skin 15 and hold it tight like the thumb and index finger of a human hand. The gripping members 17 can in particular each be designed like the jaws of combination pliers.

The gripping members 17 subsequently carry out a first working movement in the direction of the support surface 19 to pull the lower side of the skin 15 smooth in a downward direction in this manner so that the lower side of the skin 15 is substantially planoparallel to the support surface 19 for the sausage in the region between the two gripping members 17, as is shown in FIG. 2a.

Subsequently, an incision is made in the skin 15 by means of a cutting apparatus 21, staring from the starter cut, in the region between the gripping members 19 and parallel to the longitudinal extent of the sausage.

The gripping members 17 can hereby subsequently raise the skin away from the support surface 19 in that they carry out a second working movement. The second working movement can be a stroke movement simultaneous with a movement apart of the gripping members 17, as is indicated by the arrows in FIG. 3. The gripping members 17 are both moved linearly upwardly, that is in the same sense in this respect, but are additionally moved apart in opposite senses on an in particular curved path. The gripping members 17 in this respect together describe a "U" at least approximately.

FIG. 4 shows the result of this second working movement. The skin 15 is raised so much by means of the gripping members 17 that the skin 15 is pulled off the sausage as a whole by a conveying movement of the sausage 11 relative to the gripping members 17 in the conveying direction F. Alternatively, the gripping members 17 can be moved rearwardly with a stationary sausage or with a sausage likewise moved to the front. A relative movement between the sausage and the gripping members or, more generally, a holding device holding the skin tight is therefore decisive. While the sausage so-to-say "has the skin peeled off" in this manner, the skin 15 is held tight by the two gripping members 17 at the two skin ends which are created by the incision in accordance with FIG. 3. At the end of the skinning process, the gripping members 17 release the skin ends so that the pulled off skin is free for disposal.

The conveying movement of the sausage 11 relative to the gripping members 17 can start as soon as the second working movement of the gripping members 17 begins, that is during the raising of the skin 15 away from the support surface 19.

As long as the sausage is not conveyed relative to the gripping members 17, the incision by means of the cutting apparatus 21 only takes place in the front region of the sausage. The cutting apparatus 21, however, remains in its active cutting position so that an incision is made in the skin 15 up to the rear product end during the subsequent conveying movement of the sausage while continuing the initial incision over the total length of the sausage.

A special feature of the cutting apparatus 21 in accordance with the invention comprises the fact that it can be designed in a preferred embodiment so that it cuts exactly between the skin and the product such that the product itself does not come into contact with the cutter or blade. This can take place by a protective element of the cutting apparatus associated with the actual cutter or blade which is e.g. made of stainless steel and is always disposed between the skin and the product and thus between the cutter or blade and the product.

The product is, on the one hand, in an advantageous manner not damaged hereby, which in particular has a positive effect on the appearance of the sausage slices which are produced by slicing the skinned sausage by means of a slicer. On the other hand, the product is not contaminated by the incision since the cutting apparatus 21 only comes into contact with the skin 15.

Provision can be made on the conveying of the sausage through the skinning station relative to the gripping members 17 that a check is e.g. made by means of a light barrier whether the skin which is pulled off simultaneously during the conveying of the sausage is not torn off.

The disposal of the skin 15 can take place, for example, into a container or into another collection device. It is furthermore possible in particular to shred the skin automatically to reduce the waste volume in this manner. It is furthermore possible to suck off the skin to remove it completely from the region of the skinning station in this manner.

A particular advantage of the invention is that the skin 15 is pulled off the sausage as a whole. Only one signal skinning process is thus necessary, which has an advantageous effect on the working speed.

FIG. 5 shows a perspective view of an apparatus 23 in accordance with the invention. The apparatus 23 in accordance with the invention has a supply device 25 with a reception surface 27 onto which sausages such as the sausage 11 can be placed and on which the sausages can each be supplied singly to a raising device 29 due to their weight on the basis of the slope of the reception surface 27. The sausage 11 is raised from the lifting device 29 onto a conveying belt 31 which is shown in FIG. 6 which shows a side view of the apparatus 23.

On the raising of the sausage 11 onto the conveyor belt 31, the sausage 11 with the end facing a skinning station 33 which is arranged in the apparatus 23 in accordance with the invention is provided with a defined starter cut. A possibly present product clip at this sausage end which closes the skin is hereby simultaneously removed. The sausage 11 is moved along the conveying direction F and thus supplied to the skinning station 33 by the conveyor belt 31.

Figure 7:
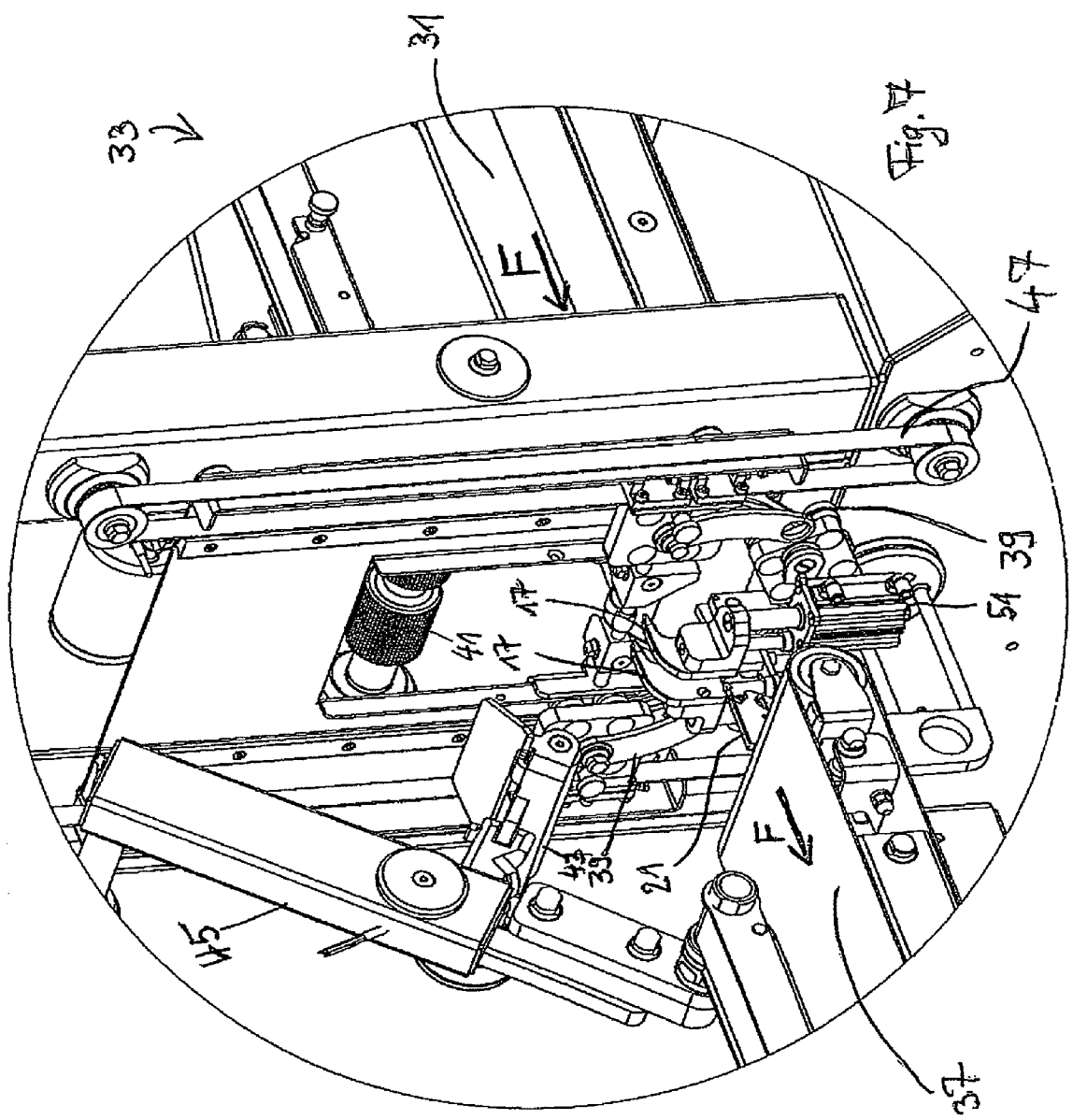

FIG. 7 shows a perspective view of the skinning station 33. The skinning station 33 includes gripping members 17. The gripping members 17 are formed in plier shape and are shown in an open position in FIG. 7. The gripping members 17 can grip an object, here the skin of a sausage, like the jaws of combination pliers or the thumb and index finger of a human hand. The gripping members 17 can in particular engage into the end and thus into the starter cut of a sausage which is guided to the gripping members 17 by means of the conveyor belt 31 and which is e.g. detected by means of sensors such as a light barrier, for instance, The gripping members 17 are located in the skinning station 33 in the space between the conveyor belt 31 and a further conveyor belt 37 which is provided for the transporting away of the skinned sausage. The gripping members 17 are each arranged at a holding apparatus 39. The holding apparatus 39 is movable, in particular upwardly and to the side, via a drive 47. An electric motor 51 is furthermore arranged at each holding apparatus 39 and is provided to open and close the gripping member 17. Furthermore, each gripping member 17 can be lowered for the carrying out of the first working movement of the gripping members 17.

A cutting apparatus 21 is arranged between the gripping members 17. This has, in particular at its upper side, a blade or the like which is provided for the cutting of the skin of the sausage. The position of the cutting apparatus 21 can be adjusted from the position shown in FIG. 7 in particular vertically and in the opposite direction to the conveying direction F.

The skinning station 33 additionally includes a first roller 41 which is arranged at a fixed position in the skinning station 33. The skinning station 33 furthermore has a second roller 43 which is arranged at a pivot arm 45 and can thus be pivoted from a position shown here toward the first roller 41.

Figure 8:
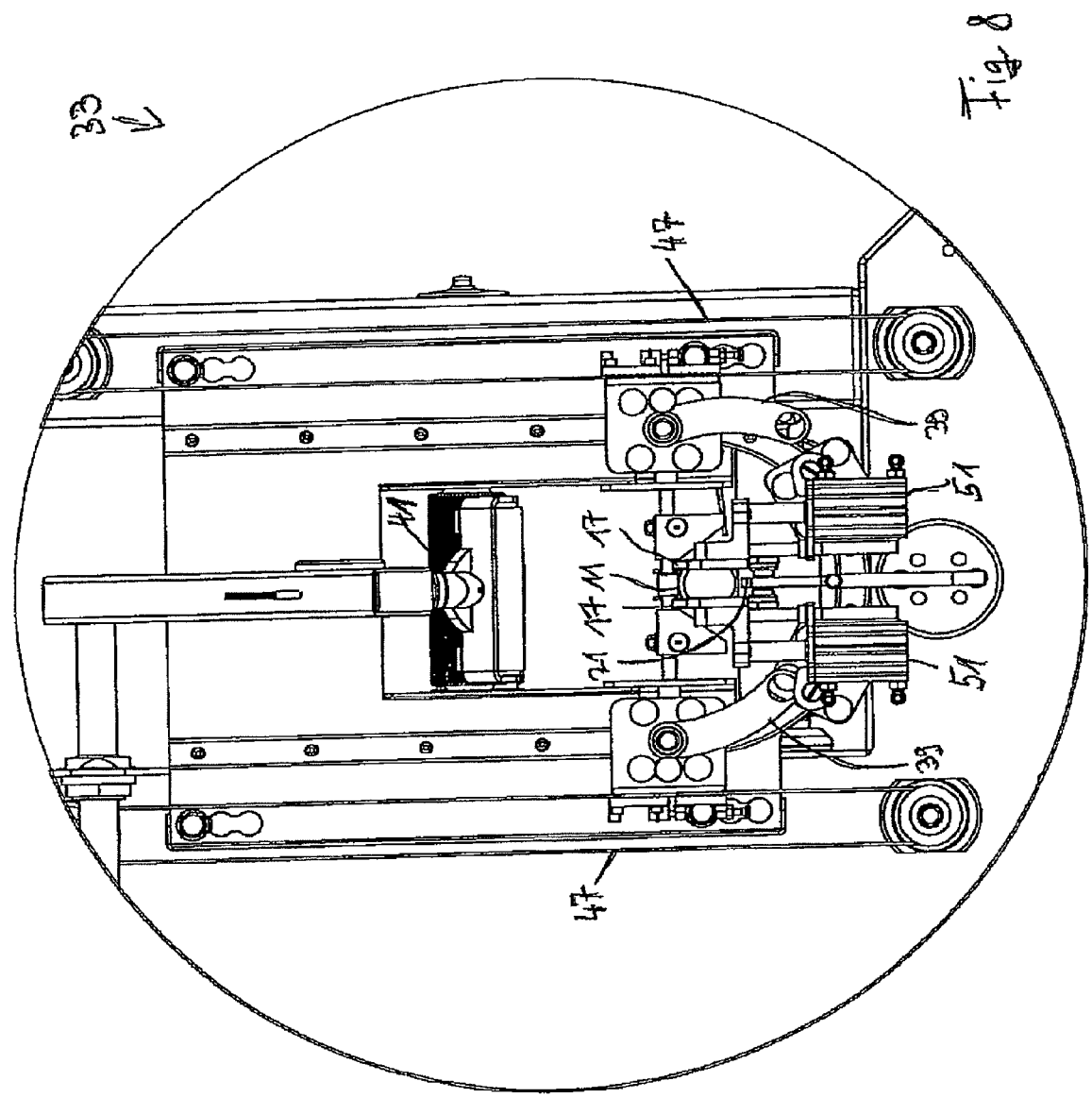

FIG. 8 shows the front view of the skinning station 33 corresponding to FIG. 7, with it being able to be recognized from FIG. 8 that a sausage 11 has been transported with its end and thus with the defined starter cut toward the opened gripping members 17. The cutting apparatus 21 is located beneath the skin and—as can be seen from FIG. 7—still at a position in front of the sausage so that a cut is not yet made at the sausage by the cutting apparatus 21.

FIG. 9 shows a side view or the skinning station 33 with now closed gripping members 17. In this respect, the gripping members 17 have gripped the skin of the sausage 11 in the region of the starter cut at two points spaced apart from one another in the peripheral direction. The cutting apparatus 21 is still in the space in front of the sausage 11 so that no incision has yet been made into the skin.

FIG. 10 shows a side view of the skinning station 33, with the gripping members 17 having gripped the skin in the region of the starter cut. The gripping members 17 pull the skin flat downwardly into a plane by a first working movement. The cutting apparatus 21 is then moved in the direction of the skin and upwardly into the cutting position to make an incision into the skin, starting from the starter cut, in the region between the gripping members 17 parallel to the longitudinal extent of the sausage 11. The conveyor belt 31 and the conveyor belt 37 are preferably likewise in the plane into which the skin is pulled flat. The cutting apparatus 21 can thereby remain in the above-named cutting position, whereas the sausage 11 is transported by the conveyor belt 31 in the conveying direction F to the conveyor belt 37 and thus over and past the cutting apparatus 21 so that the skin is cut through in the lower region and in the longitudinal direction of the sausage 11.

FIG. 11 shows a front view of the skinning station 33 in which the cutting apparatus 21 has been moved into the plane in which the conveyor belts 31 and 37 are also disposed and, which cannot be seen here, is moved in the direction of the sausage so that an incision is made into the skin of the sausage 11 after a first working movement of the gripping members 17 has taken place by which the skin is pulled downwardly and flat into this plane. The cutting apparatus 21 then remains in this position and the sausage 11 is moved over and beyond the cutting apparatus 21 during a second working movement of the gripping members 17 in which the gripping members 17 are moved apart and raised (see below). A holding down device 49 in this respect prevents the sausage from being pulled upwardly due to the stroke movement and movement apart of the gripping members 17.

FIG. 12 shows a perspective view of the skinning station 33 in which the gripping members 17 are located in an intermediate position to the side of the sausage 11. The gripping members 17 continue to grip the skin (not drawn here) of the sausage 11 and thus pull the skin off the sausage 11. In this respect, the sausage 11 is moved by the conveyor belt 31 in the conveying direction F so that this relative movement between the sausage 11 and the gripping members 17 supports the pulling off of the skin 15.

FIG. 13 shows the front view of the skinning station 33 in which, as already mentioned with respect to FIG. 12, the gripping members 17 are located to the side of the sausage 11 approximately at the level of the central plane 22 (FIG. 1) and pull the skin 15—drawn schematically here—off the sausage 11, starting from the incision at the lower side due to the stroke movement, on the one hand, and the movement apart, on the other hand.

FIG. 14 shows a perspective view of the skinning station 33 in which the gripping members 17 have moved further in the course of the second working movement and are located to the side of and above the sausage 11. As the comparison with FIG. 12 shows, the sausage 11 has actually already been transported further in the conveying direction F than is shown in FIG. 14.

Figure 15:
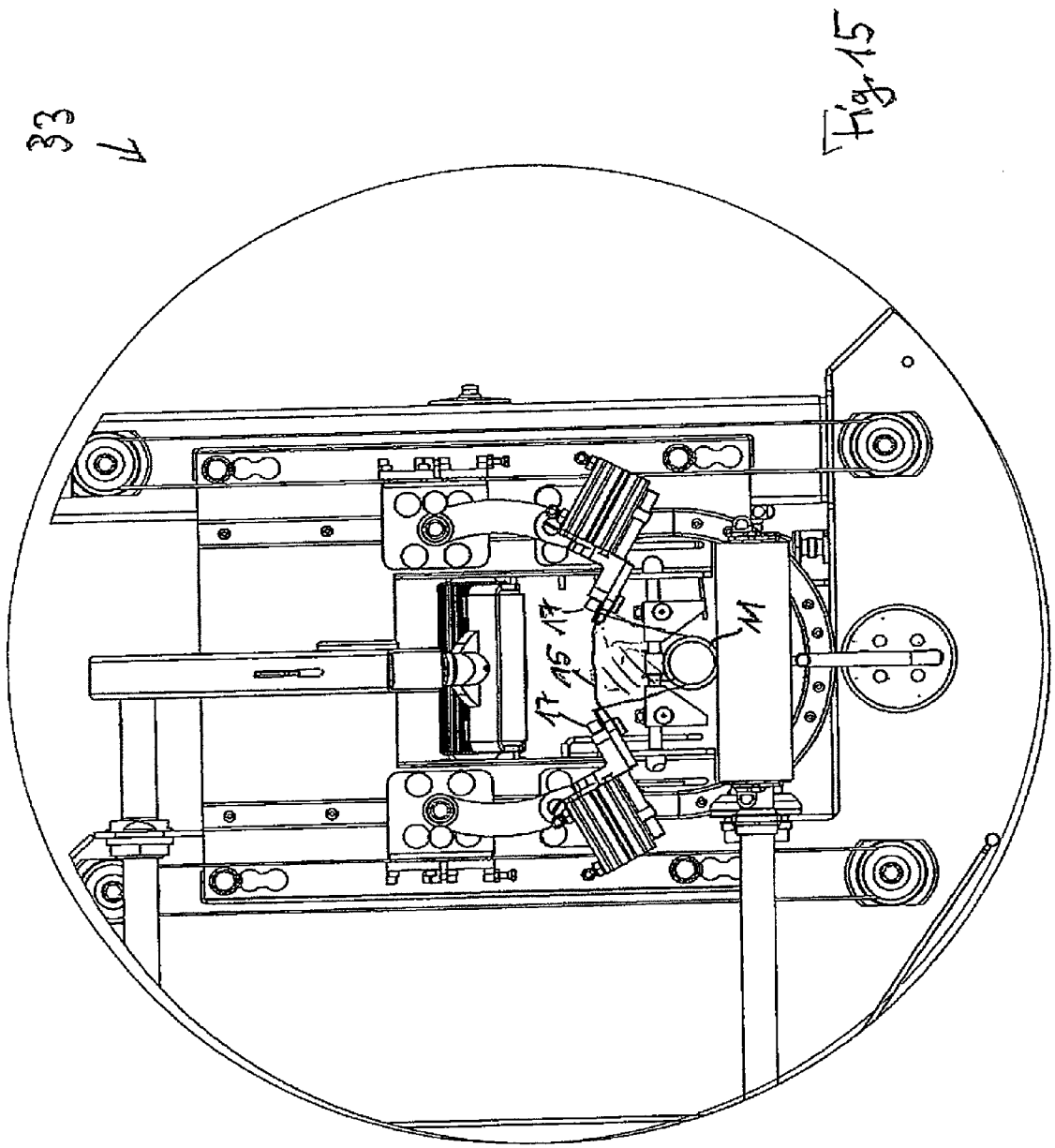

FIG. 15 shows a front view of the skinning station 33 corresponding to FIG. 14 in which the skin 15 has been drawn schematically.

FIG. 16 shows a perspective view of the skinning station 33 in which the gripping members 17 have reached the end position of the second working movement in which they are located above the active region of two rollers 41, 43. The skin still held by the grippers 17 is hereby located in a region between the first roller 41 and the second roller 43, with the latter not yet having reached its end position. The sausage 11 has actually been transported further in the meantime than is shown in FIG. 12 so that the gripping members 17 were able to pull more skin off the sausage 11 on their way into the end position. After the end position of the gripping members 17 has been reached, the pivot arm 45 of the second roller 43 is pivoted in the direction of the first roller 41 so that the two rollers 41, 43 engage the skin located therebetween. Only then are the gripping members 17 opened so that they release the skin.

FIG. 17 shows the front view of the skinning station 33 corresponding to FIG. 16. As can be recognized by a joint review of FIGS. 11, 13, 15 and 17, the gripping members 17 approximately describe a "U" in the course of the second working movement due to the linearly upwardly directed stroke movement and the simultaneously occurring movement apart of the two gripping members 17 relative to one another.

FIG. 18 shows a perspective view of the skinning station 33 in which the first roller-shaped element 41 and the second roller-shaped element 43 are arranged adjacent to one another so that the skin of the sausage 11 is engaged in the roller gap thereby formed. In this respect, the sausage 11 was moved—contrary to what is shown—even further in the conveying direction F than in FIG. 16. After the engaging of the skin by the rollers, the gripping members are opened. At least one roller 41, 43 can be set into rotation by means of a drive so that the skin is now pulled off the sausage by the two rollers 41, 43 on the movement of the sausage 11 in the direction of the conveying direction F until the end of the sausage is reached and the sausage 11 has been fully skinned. The conveying movements of the conveyor belts for the sausage 11, on the one hand, and of the roller pair 41, 43, on the other hand, are matched to one another.

FIG. 19 shows the front view of the skinning station 33 corresponding to FIG. 18.

REFERENCE NUMERAL LIST 11 sausage
13 tapering, round end of the sausage
15 skin
17 gripping member
19 support surface
21 cutting apparatus
22 central plane
23 apparatus
25 supply device
27 reception surface
29 lifting device
31 conveyor belt
33 skinning station
37 conveyor belt
39. holding device
41 first roller
43 second roller
45 pivot arm
47 drive
49 holding-down device
51 drive

The invention claimed is:

1. A method for skinning of a generally elongate food product having a generally central axis defining a longitudinal direction, the method comprising:
   providing a starter cut at a first end of the food product;
   gripping a skin of the food product near the starter cut, using two gripping members disposed at two respective points spaced apart from one another in a peripheral direction of the food product, wherein the two points are disposed beneath a first, generally horizontally aligned central plane in which the central axis of the food product extends;
   with the gripping members, pulling the skin flat into a second plane extending substantially parallel to a support surface on which the food product is supported;
   making an incision into the skin, starting from the starter cut, between the gripping members and substantially parallel to the longitudinal direction of the food product;
   with the gripping members, raising the skin away from the second plane;
   conveying the food product substantially along the longitudinal direction; and
   pulling the skin off the food product.

2. A method in accordance with claim 1, wherein the support surface for the food product is essentially disposed in a plane into which the skin is pulled flat by a first working movement of the gripping members.

3. A method in accordance with claim 2, wherein the skin is pulled flat to the support surface for the food product by the first working movement of the gripping members.

4. A method in accordance with claim 1, wherein the starter cut is provided by cutting off the food product end.

5. A method in accordance with claim 4, wherein the starter cut provided by cutting off the food product end is substantially perpendicular to the longitudinal extent of the food product.

6. A method in accordance with claim 1, wherein the starter cut is provided by spot-drilling the food product end substantially parallel to the longitudinal extent of the food product.

7. A method in accordance with claim 1, wherein essentially no conveying movement of the food product takes place relative to the gripping members during a pulling flat of the skin and during the incision into the skin taking place in the region of the starter cut.

8. A method in accordance with claim 2, wherein, on the raising of the skin, the skin ends gripped by the gripping members are simultaneously moved from a plane into which the skin is pulled flat by the first working movement of the gripping members, and are moved away from one another.

9. A method in accordance with claim 8, wherein the plane, from which the skin ends simultaneously moved, is the support surface.

10. A method in accordance with claim 2, wherein working movement of the gripping members serving for the raising of the skin is carried out as a stroke movement simultaneous with a movement apart, with the stroke movement substantially taking place in the same sense in a linear fashion and the movement apart taking place in opposite senses along a curved path.

11. A method in accordance with claim 1, wherein the conveying movement of the food product, starts during the raising of the skin.

12. A method in accordance with claim 11, wherein the conveying movement of the food product is relative to the gripping members.

13. A method in accordance with claim 1, wherein a further incision is made into the skin up to the rear product end during the conveying movement of the food product while continuing the incision which took place at the starter cut.

14. A method in accordance with claim 13, wherein the conveying movement of the food product is relative to the gripping members.

15. A method in accordance with claim 1, wherein the skin is brought between a first element, and a second element by the working movement of the gripping members, with the first element and the second element engaging the skin.

16. A method in accordance with claim 15, wherein the skin being brought between and engaged by the first element and the second element is transported away through a gap formed by the elements.

17. A method in accordance with claim 16, wherein the first element is of roller form, the second element is of roller form, and the gap is a roller gap.

18. A method in accordance with claim 15, wherein the gripping members release the skin after the engaging of the skin by the first element and the second element.

19. A method in accordance with claim 1, wherein the starter cut provided at a front food product end is in the region of a tapering section of the food product at the end.

\* \* \* \* \*